United States Patent [19]

Nakai

[11] 4,273,308

[45] Jun. 16, 1981

[54] ROTARY VALVE

[75] Inventor: Osamu Nakai, Hirakata, Japan

[73] Assignee: Kubota, Ltd., Osaka, Japan

[21] Appl. No.: 90,716

[22] Filed: Nov. 2, 1979

[30] Foreign Application Priority Data

Nov. 4, 1978 [JP] Japan .................................. 53/136020
Dec. 16, 1978 [JP] Japan .................................. 53/155294

[51] Int. Cl.³ ............................................. F16K 25/00
[52] U.S. Cl. ..................................... 251/88; 251/214;
251/305
[58] Field of Search ............... 251/305, 306, 308, 214,
251/84, 86, 88; 308/237 R

[56] References Cited

U.S. PATENT DOCUMENTS

| 1,824,168 | 9/1931 | Orton ................................... 251/306 |
| 2,737,375 | 3/1956 | Kittler .................................... 251/84 |
| 2,738,158 | 3/1956 | Fuglie .................................... 251/84 |
| 4,022,424 | 5/1977 | Davis et al. ........................... 251/305 |
| 4,146,206 | 3/1979 | Malloy et al. ........................ 251/308 |
| 4,188,012 | 2/1980 | Johnson ............................... 251/308 |
| 4,200,258 | 4/1980 | Gliatas ................................. 251/308 |

Primary Examiner—William R. Cline
Assistant Examiner—H. Jay Spiegel
Attorney, Agent, or Firm—Edwin E. Greigg

[57] ABSTRACT

A concentric rotary valve having a rotatable stem of a valve disc supported by bearing portions and metal seats mounted in a valve housing to contact metal seats on the valve disc. Clearances in directions parallel to a closed disc surface and radial of the valve stem are barely enough to permit a shift of the valve disc to provide a good seat-to-seat contact when the valve is closed, and clearances in directions normal to the closed disc surface and radial of the rotatable stem are barely enough to permit normal rotations of the stem.

10 Claims, 10 Drawing Figures

ROTARY VALVE

BACKGROUND OF THE INVENTION

The present invention relates to a concentric rotary valve (one in which the rotatable stem, support bearings, disc, and seats have a common axis) having a rotatable stem of a valve disc supported by bearing portions and metal seats mounted in a valve housing to contact metal sheets on the valve disc.

As shown in FIGS. 9 and 10 of the accompanying drawings, the rotatable stem 100 and the bearing portions 101 of a conventional rotary valve both have a circular cross section. It is difficult in manufacture to place the rotational axis of seat surfaces in precise alignment with the axis of the rotatable stem. Such an axial displacement causes an irregular distribution of forces between the seat surfaces and the bearing portions and ill-balanced contacting conditions of the seat surfaces, which result in fluid leakage. While rubber seats have a nip margin of 0.5 to 1 mm allowing for a 0.05 to 0.1 mm displacement of the axes, metal seats even in a large valve have a nip margine of no more than 0.05 to 0.1 mm and have to be assembled with an extremely strict axial alignment permitting a displacement as small as 0.005 to 0.01 mm. Because of this manufacturing problem a concentric rotary valve providing a tight contact between metal seats has been given up as impossible particularly where no slipperiness is allowed on the seat surfaces. There still is a technical problem with the products that have overcome the above manufacturing problem. This is explained below with reference to an inclined cylinder type concentric butterfly valve, which is regarded as the most highly developed concentric butterfly valve with metal seats, as mounted in a medium or high pressure fluid pipeline.

As a fluid pressure acts on a valve disc 102 in its closed position as shown in FIG. 9, the presence of a clearance 103 permits the valve disc 102 and the rotatable stem 100 to shift along the direction of the fluid pressure. At this time, the valve disc 102 still receives a torque acting in a direction to open it, as shown in FIG. 10. Thus the valve disc 102 keeps rotating while following a deformation of the valve housing and presses against metal seats 104 on the housing. Since the metal seat 104 disposed on the lefthand side of the valve housing in FIG. 10 is inclined so as to constrict in the direction in which the fluid pressure acts, an arcuate flexion of the valve disc 102 added to its initial shift noted above reinforces an intimate contact between the seat on the lefthand side of the valve disc and the seat 104 on the valve housing. Conversely, the metal seat 104 disposed on the righthand side of the valve housing in FIG. 10 is inclined so as to broaden in the direction in which the fluid pressure is acting, and therefore the arcuate flexion of the valve disc 102 relaxes the contact between the seat on the righthand side of the valve disc and the seat 104 on the righthand side of the housing, which results in fluid leakage.

SUMMARY OF THE INVENTION

It is an object of the present invention to provide a concentric rotary valve with a simple construction effective to prevent fluid leakage due to disalignment by manufacturing errors of the center of the seat surface circle and the axis of the rotatable stem and to flexions of the valve disc.

To this end, a concentric rotary valve having a rotatable stem of a valve disc supported by bearing portions and metal seats mounted in a valve housing to contact metal seats on the valve disc according to this invention is characterized in that clearances between trunnion containing portions of the valve housing and the rotatable stem or clearances between the trunnion containing portions and bearing portions comprise a combination of circular and elliptic or oval track (as of a sport arena) shapes, the clearances in directions parallel to a closed disc surface and radial of the rotatable stem being barely enough to permit a shift of the valve disc to provide a good seat-to-seat contact when the valve is closed, and the clearances in directions normal to the closed disc surface and radial of the rotatable stem being barely enough to permit normal rotations of the rotatable stem.

As large clearances are provided in the direction normal to the direction in which the fluid pressure acts, namely in the direction at right angles to the load acting on the bearing portions of the valve housing, the rotatable stem carrying the valve disc is permitted to shift automatically in that direction. This aspect ensures a uniform and strong pressure that causes the metal seats on the valve disc to contact the metal seats on the valve housing.

Such an extremely simple modification consisting only in rationally defining the above clearances has proved effective to prevent leakage of a high pressure fluid.

The elliptic shape and the running track shape are hereinafter collectively referred to as elliptic-oval shape.

Both the outer cross sections of bushes or bush containing tubes and two bores may have elliptic-oval shapes with long and short portions arranged in opposed relations respectively. It achieves the object of the present invention so long as the clearances have greater dimensions in directions parallel to the metal seat surfaces than in directions normal thereto.

Other objects and advantages of this invention will be apparent from the following description.

BRIEF DESCRIPTION OF THE DRAWINGS

In the drawings illustrating a rotary valve according to the invention.

DETAILED DESCRIPTION OF THE PREFERRED EMBODIMENTS

Figure 1:
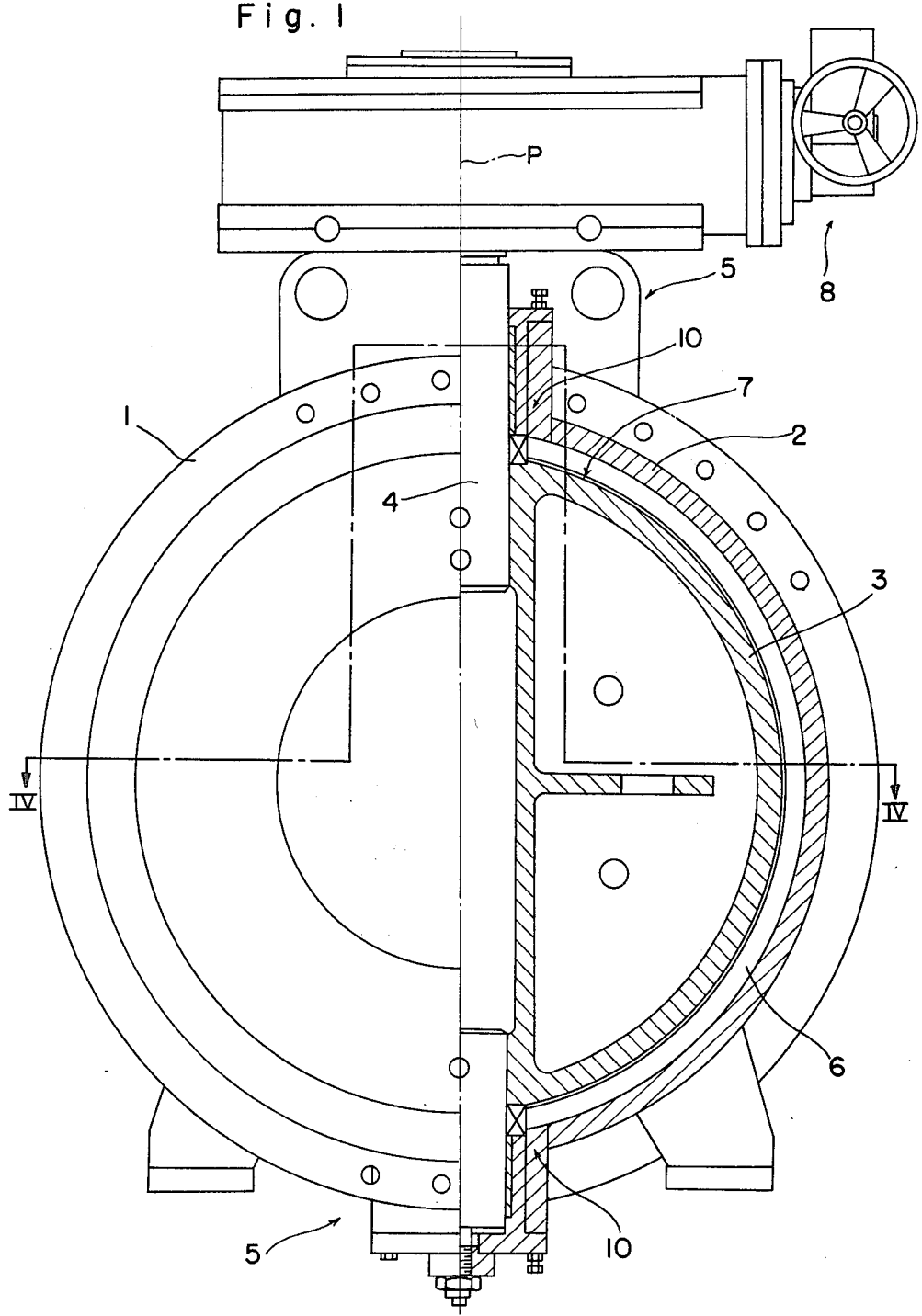
FIG. 1 is a general front view of the valve in its closed position with a principal portion shown in section.
Figure 2:
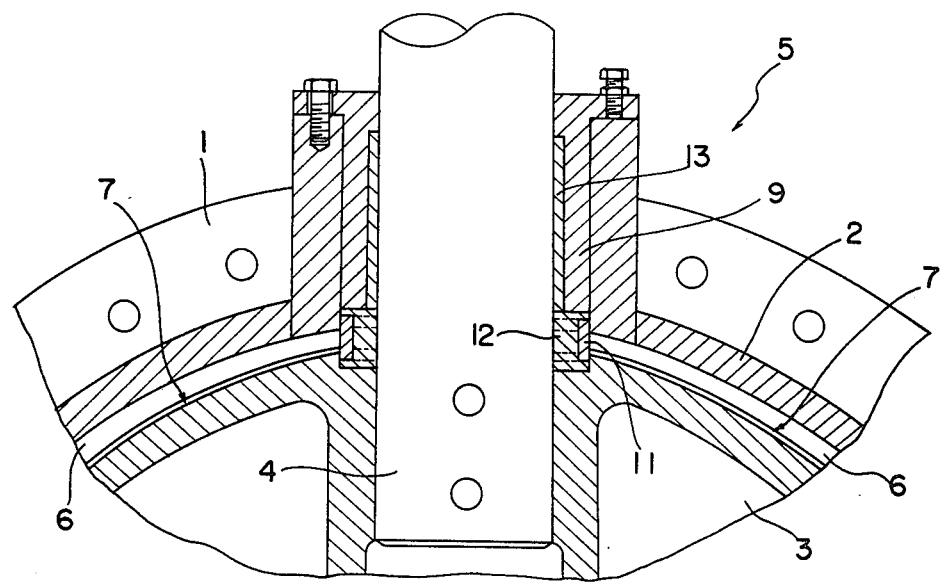
FIG. 2 is an enlarged sectional view of an upper bearing portion.

A valve housing 2 has flanges 1 for coupling to a pipeline and bearing portions 5 supporting a rotatable stem 4 carrying a valve disc 3. The housing 2 includes a pair of metal seats 6 mounted in its inner peripheral portion such that one end surface of one of the seats is opposed to one end surface of the other seat across the stem 4. The valve disc 3 has metal seats 7 mounted on its periphery and adapted to contact the above mentioned seats 6 when the valve is closed. One end of the stem 4 protrudes from the housing 2 and is connected to a valve operating mechanism 8.

Each bearing portion 5 comprises a bush containing tube 9 attached to the housing 2, a tubular holder 12 disposed on the side of the bush containing tube 9 supported in a trunnion 10 and facing the interior of the housing 2, and an elastic seal element 11 fitted in the holder 12.

Figure 3:
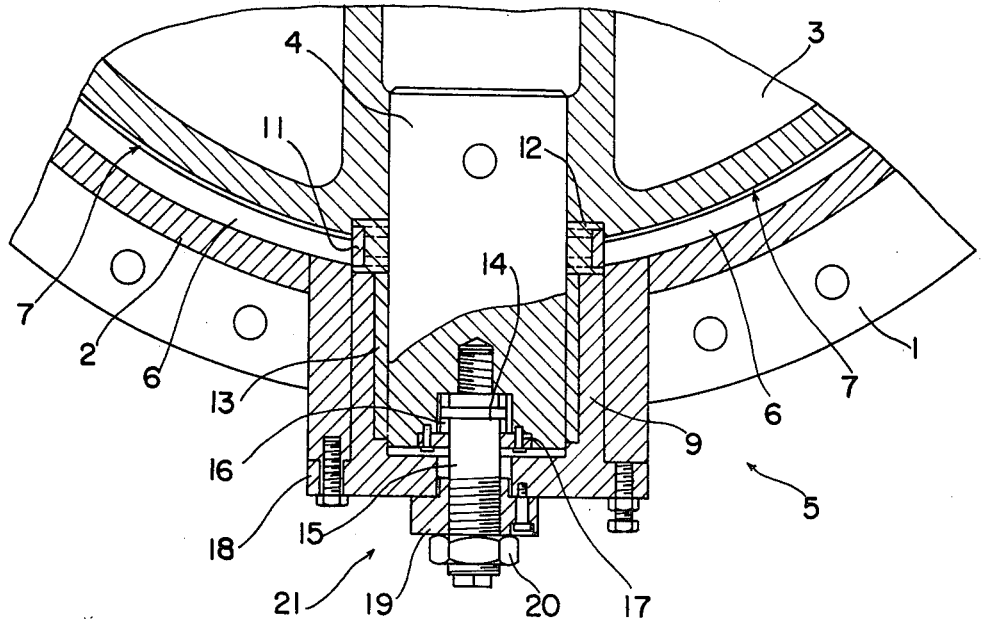
FIG. 3 is an enlarged sectional view of a lower bearing portion.

As shown in FIG. 3, the lower bearing portion 5 includes a support member 15 having a threaded portion at one end thereof and a collar 14 at the other end and carrying thrust rings 16 on both sides of the collar axially of the support member 15. The support member 15 is fitted into a recess of the stem 4 rotatably relative to the stem 4 by means of a stopper 17. The lower bearing portion 5 further includes a pressing member 18 for pressing the bush containing tube 9 towards the valve disc 3, the pressing member 18 having a center bore receiving the threaded portion of the support member 15. A rotatable element 19 is fitted on and in mesh with the threaded portion of the support member 15 and secured to the pressing member 18. Furthermore, a lock nut 20 is mounted on the support member 15. The above arrangement constitutes an adjustment mechanism 21 adapted to effect positional adjustments of the stem 4 in axial directions thereof in relation to the bush containing tube 9, namely adjustments in the said axial directions of contacting conditions of the seats 6 on the housing and the seats 7 on the valve disc, by rotating the rotatable element 19 relative to the support member 15.

Figure 4:
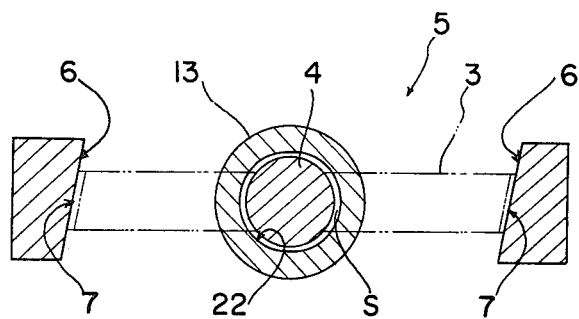
FIG. 4 is a partly sectional view taken on line IV—IV of FIG. 1.

As shown in FIG. 4, the bearing portions 5 have apertures 22 of elliptic-oval shaped cross section for supporting the stem 4 and the stem 4 has a circular cross section which, when the valve is closed, provide clearances between the stem 4 and each of the bearing portions 5 such that the clearances in directions parallel to the disc surfaces and radial of the rotatable stem are barely enough to permit a shift of the valve disc to provide a good seat-to-seat contact and the clearances in directions normal to the disc surfaces and radial of the rotatable stem are barely enough to permit normal rotations of the stem. This structure therefore prevents a clearance between the seats 7 on the valve disc and the seats 6 on the valve housing as a result of a displacement of the valve stem 4 relative to the bearing portions 5 in directions normal to the closed disc surface.

Figure 5:
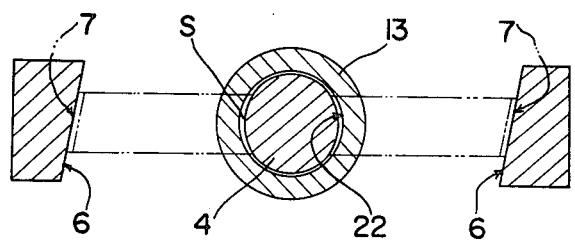
FIG. 5 is a view corresponding to FIG. 4 and showing another embodiment in which a valve stem has an elliptic cross section and a stem bore has a circular cross section.

FIG. 5 shows another embodiment in which the valve stem 4 has an elliptic-oval shaped cross section and the apertures of the bearing portions 5 have a circular cross section.

Further embodiments are now described with reference to FIGS. 6 to 8 in which the clearances in the bearing portions are provided between bushes fitted on the rotatable stem and bush containing tubes or between the bush containing tubes and the bearing portions of the valve housing.

Figure 6:
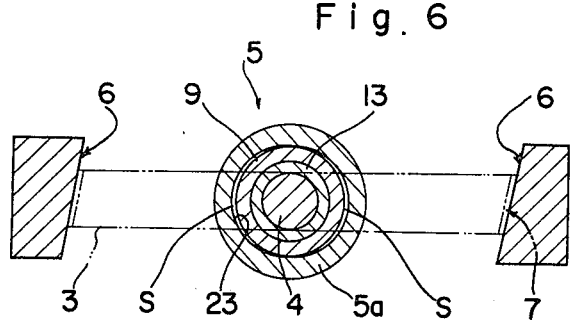
FIG. 6 is a view corresponding to FIG. 4 and showing a further embodiment in which a bush containing tube has a circular cross section and a valve housing has an elliptic-oval shaped cross section.

In FIG. 6, an aperture 23 receiving the bush containing tube 9 has an elliptic-oval shaped section and the bush containing tube 9 has a periphery of circular cross section.

Figure 7:
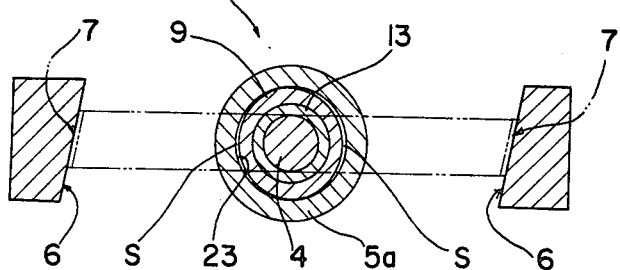
FIG. 7 is a view corresponding to FIG. 4 and showing a still further embodiment in which a bush containing tube has an elliptic-oval shaped section and a valve housing has circular section.

In another embodiment shown in FIG. 7, the bush containing tube 9 has a periphery of elliptic-oval shaped cross section and the aperture 22 in each bearing portion 5a of the housing for receiving the bush containing tube 9 has a circular section.

Figure 8:
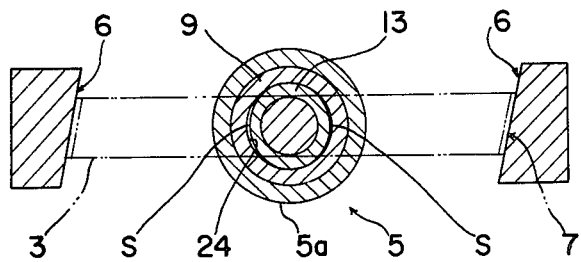
FIG. 8 is a view corresponding to FIG. 4 and showing a still further embodiment in which a bush has a circular cross section and a bush containing tube has an elliptic-oval shaped cross section.
Figure 9:
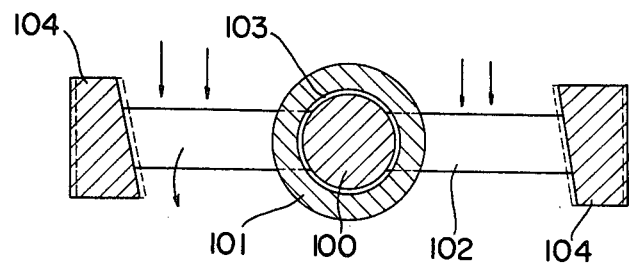
FIGS. 9 and 10 are views corresponding to FIG. 4 and showing a prior art structure.
Figure 10:
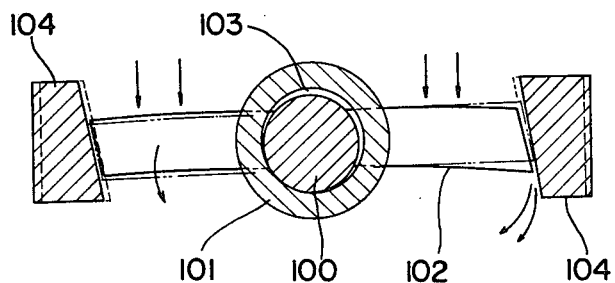

In a further embodiment shown in FIG. 8, an aperture 24 receiving the bush 13 of the bush containing tube 9 has an elliptic-oval shaped cross section and the bush 13 has an outer periphery of circular cross section to permit the bush 13 to move integrally with the valve stem 4 and relative to the bush containing tube 9 in radial directions towards the metal seats 6.

I claim:

1. A rotary valve comprising:
a housing having an inlet and an outlet;
bearing means supported on an axis of said housing;
a rotatable valve stem supported by said bearing means;
said rotary valve stem including bearing surfaces juxtaposed said bearing means;
a valve disc coaxially supported by said valve stem within said housing between said inlet and said outlet;
a valve seat supported by said housing in direct relationship with said valve disc and operative therewith for closing said valve; and
said valve stem bearing surfaces having an outer surface configuration which is different from the inner surface configuration of said bearing means in which one of said surface configurations is a circle and the other of said surface configurations is elliptic-oval shaped which forms a clearance between said valve stem bearing surfaces and said bearing means;
whereby said clearance between said valve stem bearing surfaces and said bearing means is greater in a direction perpendicular with the flow of fluid than in a direction parallel to the fluid flow.

2. A rotary valve as claimed in claim 1, wherein:
said bearing means includes bushings; and
the clearance is between said rotatable valve stem bearing surface and said bushing.

3. A rotary valve as claimed in claim 2, wherein:
said valve stem bearing surfaces have an elliptic-oval configuration; and
said bearing means has a circular inner surface configuration.

4. A rotary valve as claimed in claim 2, wherein:
said valve stem bearing surfaces have a circular configuration; and
said bearing means has an inner surface configuration of an elliptic-oval shape.

5. A rotary valve as claimed in claim 1, wherein:
said valve stem bearing surface includes a bushing thereon in the area of said bearing means; and
said bearing means includes a tubular means.

6. A rotary valve as claimed in claim 5, wherein:
said bushing has an elliptic-oval configuration; and
said tubular means has a circular configuration.

7. A rotary valve as claimed in claim 5, wherein:

said bushing has a circular configuration and said tubular means has an elliptic-oval configuration.

8. A rotary valve as claimed in claim 1, wherein:
said valve stem bearing surface includes a bushing and a tubular means thereon in the area of said bushing means;
and said bushing means includes a bearing portion.

9. A rotary valve as claimed in claim 8, wherein:
said tubular means on said valve stem has an elliptic-oval configuration; and
said bearing portions have a circular configuration.

10. A rotary valve as claimed in claim 8, wherein:
said tubular means on said valve stem has a circular configuration; and
said bearing portions have an elliptic-oval configuration.

* * * * *